W. L. BLACK.
CHECK ROWERS.

No. 182,796. Patented Oct. 3, 1876.

WITNESSES:
Chas. Niota
John Goethals

INVENTOR:
Wm L. Black
BY
Munn
ATTORNEYS.

UNITED STATES PATENT OFFICE.

WILLIAM L. BLACK, OF VIRGINIA, ILLINOIS.

IMPROVEMENT IN CHECK-ROWERS.

Specification forming part of Letters Patent No. 182,796, dated October 3, 1876; application filed August 7, 1876.

*To all whom it may concern:*

Figure 1:
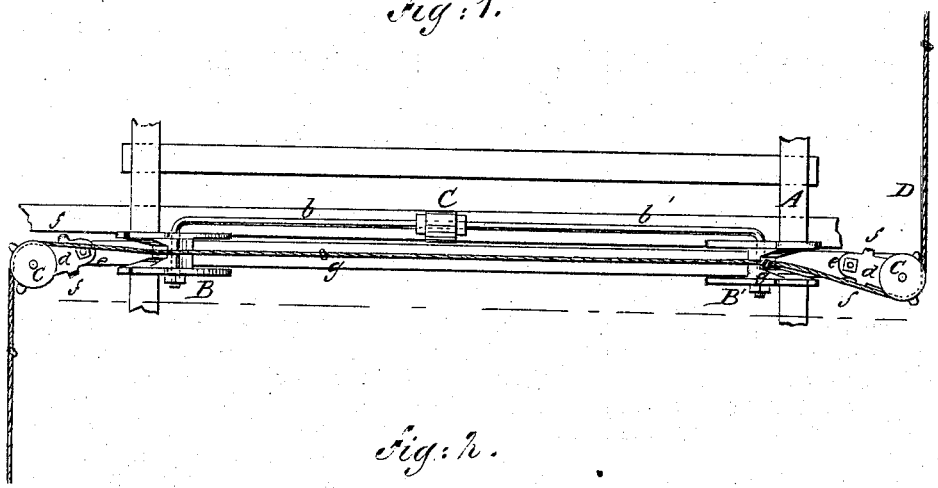
Figure 2:
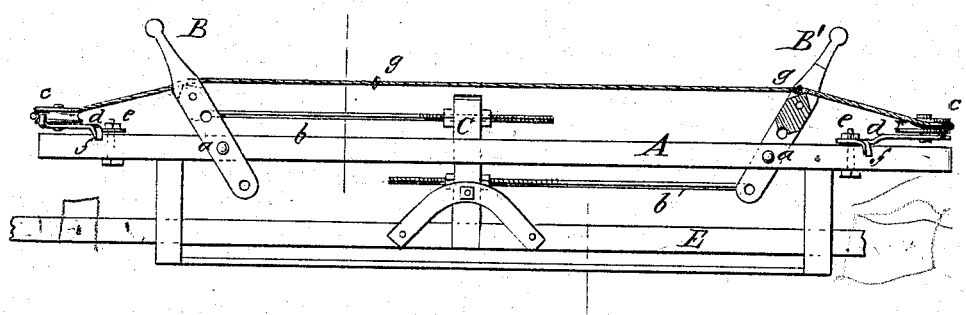
Figure 3:
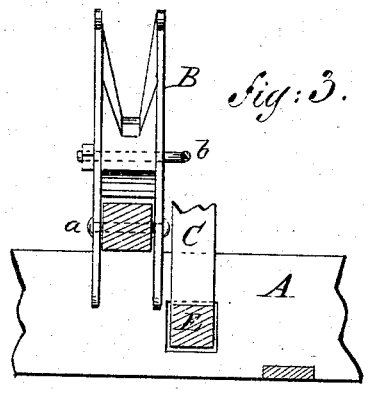

Be it known that I, WILLIAM L. BLACK, of Virginia, in the county of Cass and State of Illinois, have invented a new and Improved Check-Rower, of which the following is a specification:

Figure 1 is a plan. Fig. 2 is a side elevation. Fig. 3 is a section on line $x$ $x$ in Fig. 2.

Similar letters of reference indicate corresponding parts.

My invention relates to an attachment for corn-planters; and it consists of a pair of forked levers attached to a supporting-frame, and connected by rods with the seed-valve bar of a corn-planter, and is operated by a rope having knots or buttons at regular intervals, which pass around a sheave at each end of the supporting-frame and through the forks of the levers, and is attached to stakes at each end of the field.

A is a supporting-frame, which may be attached to any corn-planter. B B' are forked levers, that are pivoted to the upper bar of the frame at $a$ $a'$, and are provided with connecting-rods $b$ $b'$, which run through an arm, C, that projects upward from the sliding bar E. The rods $b$ $b'$ are provided with adjusting-nuts on each side of the arm C. The rod $b$ is connected with the lever B, above its pivot or fulcrum, and the rod $b'$ is connected with the lever B' below its fulcrum, so that the levers must move in opposite directions. The sheaves $c$ are placed on studs projecting upward from swinging plates $d$. These plates turn on the bolts $e$, and are furnished with the stops $f$ $f$, that hold the sheaves $c$ when moved to either side, so that the rope may pass from the sheaves in a direct line through the forks of the levers. The rope D that passes around these sheaves and through the forks in the levers is fixed to stakes at opposite sides of the field. $g$ $g$ are knots or buttons on the rope D that engage with the forks formed at the upper ends of the levers B B'. These forks are provided with beveled sides, so that the knot may slip out as the lever reaches the end of its stroke.

As the levers move in opposite directions, it is obvious that one knot or button in moving through the machine will move each lever. The sliding bar E is attached in any convenient manner to the seed-valve bar of the corn-planter.

A corn-planter having this attachment will accurately plant alternating rows.

Having thus described my invention, I claim as new and desire to secure by Letters Patent—

The sliding valve-bar E, connected with forked levers B B' by adjustable rods $b$ $b'$ passing through valve-bar arm C, one below, the other above, frame A, and one pivoted above, the other below, the fulcrum of levers B B', constructed and arranged as and for the purpose specified.

WILLIAM L. BLACK.

Witnesses:
THOMAS MEADE,
J. T. ROBERTSON.